United States Patent [19]

Harris et al.

[11] 4,338,232

[45] Jul. 6, 1982

[54] RADIATION-CURABLE RESINS

[75] Inventors: Robert F. Harris; Dwight K. Hoffman, both of Midland, Mich.; Richard A. Hickner, Freeport, Tex.

[73] Assignee: The Dow Chemical Company, Midland, Mich.

[21] Appl. No.: 137,706

[22] Filed: Apr. 7, 1980

Related U.S. Application Data

[63] Continuation-in-part of Ser. No. 864,421, Dec. 27, 1977, abandoned.

[51] Int. Cl.$^3$ .................... C08L 63/02; C08L 63/04; C08L 63/10
[52] U.S. Cl. ............................. 523/414; 204/159.14; 204/159.15; 525/531; 525/922; 525/845; 525/801
[58] Field of Search .............. 260/29.2 EP, 29.6 NR, 260/29.3, 29.6 TA; 525/531, 922

[56] References Cited

U.S. PATENT DOCUMENTS

| | | |
|---|---|---|
| Re. 27,655 | 6/1973 | Miller . |
| 3,501,432 | 3/1970 | Wright et al. ............. 260/29.6 TA |
| 3,560,237 | 2/1971 | Miller . |
| 3,793,278 | 2/1974 | De Bona . |
| 3,936,405 | 2/1976 | Sturni et al. |
| 3,937,679 | 2/1976 | Bosso et al. |
| 3,959,106 | 5/1976 | Bosso et al. |
| 4,020,030 | 4/1977 | Harris et al. |
| 4,038,232 | 7/1977 | Bosso et al. |
| 4,125,503 | 1/1978 | McCarty et al. |

*Primary Examiner*—Allan Lieberman

[57] ABSTRACT

Novel sulfonium-stabilized, radiation-curable, water-compatible, water-in-oil emulsions and a method of preparation are described. As an example, one such emulsion was prepared by reacting the diglycidyl ether of a polypropylene glycol with essentially a stoichiometric equivalent of acrylic acid, about 0.3 equivalent of bis(2-hydroxyethyl)-sulfide and 1.5 equivalents of $H_2O$.

11 Claims, No Drawings

RADIATION-CURABLE RESINS

CROSS-REFERENCE TO RELATED APPLICATION

This application is a continuation-in-part application of our copending application Ser. No. 864,421, filed Dec. 27, 1977 and now abandoned.

BACKGROUND OF THE INVENTION

1. Field of the Invention

This invention pertains to novel water-compatible, vinyl ester resins curable with actinic or ionizing radiation inducement and their use in coating substrates. More particularly, this invention pertains to such compositions derived from epoxy resins.

2. Prior Art

It is well known that many vinyl ester resins are polymerizable by radiation inducement. This is illustrated by the disclosure in U.S. Pat. Nos. 3,560,237 (RE 27,656); 3,661,576; 3,673,140 and British Pat. No. 1,375,177. The disclosures of U.S. Pat. Nos. 3,560,237 (RE 27,656) and 3,661,576 are particularly relevant to the instant invention in that they pertain to vinyl ester resins derived from resinous epoxides (i.e., epoxy resins). Many of these vinyl ester resins from resinous epoxides are commercially available and possess excellent physical and chemical properties and are particularly useful as protective coatings for a variety of substrates. In this utility, the vinyl ester resins were normally dissolved in an organic solvent or a reactive diluent, applied by any one of several conventional techniques (e.g., spraying, dipping, etc.) to a substrate and then cured with actinic radiation.

It is also known that certain sulfonium salts can be used as accelerators for the photopolymerization of acid polymerizable and/or acid-curable materials (including epoxy resins per se, Netherland Patent Application No. 75.10320). This patent also teaches that the sulfonium salts must be soluble in the resinous component and states that the ability of a sulfonium salt to accelerate the cure of any particular material depends upon the ability of the corresponding acid, i.e., the acid containing the same anion as the sulfonium salt, to cure that material. These photocurable compositions were similarly dissolved in an organic solvent and applied to various substrates by conventional techniques.

The necessity of using an organic solvent is a commercial impediment for using the photocurable compositions set forth above. Organic solvents must be recovered and recycled or disposed of for safety, environmental and/or economic reasons. The recovery in many instances is difficult and/or costly. These problems can be reduced if the organic solvent reacts into the coating. Considerable research has been directed toward the use of vinyl monomers and low viscosity vinyl resins are reactive diluents. However, many of the useful reactive diluents, e.g., 2-hydroxyethyl acrylate, are toxic and represent considerable health and environmental problems.

Presently available radiation-curable systems use a reactive diluent such as an acrylic monomer to reduce the viscosity to the level required for application. Many of these diluents suffer from excessive toxicity, volatility or odor. In addition, since the diluent is incorporated into the final product, the amount and kind of diluent will affect the properties of the end coating. With conventional solvent systems, additional solvent can be added to adjust viscosity without materially affecting the properties of the final coating. However, the presence of these solvents poses a toxicity problem.

The commercial problems enumerated above have caused many potential customers to use alternate systems having different mechanisms of cure and/or different polymer structure, e.g., latexes.

Many resinous systems have been rendered water-soluble or water-dispersible (oil-in-water dispersions) by attaching various onium (e.g., sulfonium, phosphonium, ammonium, etc.) groups to the backbone of the resin or by adding an onium surfactant to the resin as a dispersing vehicle. Many of these onium compounds are electroreducible, particularly the sulfonium and isothiuronium compounds, and have been used in cathodic electrodeposition processes. An exhaustive documentation of this is not required; however, reference is made to U.S. Pat. Nos. 3,793,278; 3,936,405; 3,937,679; 3,959,106 and 3,894,922 which represent a series of cases in which certain onium-modified epoxy resins were alleged to be useful as electrodepositable compositions. The onium-modified epoxy resins were prepared by reacting an epoxy resin with a tertiary phosphine, tertiary amine or sulfide in the presence of an acid. The acid used in this series of experiments had dissociation constants greater than $1 \times 10^{-5}$ and included both organic and inorganic acids. Alkenoic acids, while meeting the dissociation constant criterion in many instances, were not named or used in any of these particular references.

Harris et al. (U.S. Pat. No. 4,020,030) prepared water-soluble or water-dispersible (oil-in-water) sulfonium-modified epoxy resins having superior coating properties and lower toxicity to those set forth above by using epoxy resins having an epoxy equivalent weight greater than about 500 and/or by converting greater than about 70 percent of the epoxy groups in the epoxy resins by reaction with a sulfide and an acid. These sulfonium-modified epoxy resins were used as coatings on various substrates and were applied by conventional techniques (e.g., spraying, dipping, etc.) as opposed to electrodeposition. The disclosure of Harris et al, is incorporated herewith by reference. Harris et al. found that acids having a dissociation constant greater than $1 \times 10^{-5}$ were suitable in their preparation of sulfonium-modified epoxy resins and they explicitly state that alkenoic acids (e.g., acrylic acid, methacrylic acid, etc.) are satisfactory in their process. However, these acids were converted to sulfonium alkenoates; vinyl ester resins were not considered. Harris et al. do not indicate that any of their compounds are (or would be) photocurable.

SUMMARY OF THE INVENTION

We have discovered a new class of sulfonium-stabilized, water-compatible, ionizing radiation and light curable, water-in-oil emulsions of a vinyl ester resin(s). The novel compositions are normally transparent or clear liquids into which water can be solubilized (i.e., they can be thinned to lower viscosities by dilution with water) and they are compatible with many unmodified vinyl ester resins. The compositions can then be coated onto substrates and cured by actinic light, electron beam or free-radical initiation.

DETAILED DESCRIPTION OF THE INVENTION

The compositions are conveniently prepared by reacting an epoxy compound with a sulfide in the presence of a polymerizable alkenoic acid or by reacting a monoepoxide with a sulfide in the presence of a polymerizable alkenoic acid and blending the reaction product with a vinyl ester resin.

The Epoxy Reactant

Epoxy compounds constitute a known class of compunds, each member of which bears at least one pendant or terminal 1,2-epoxy group (i.e., vicinal epoxy groups). Any member of this known group is suitable for use herein so long as the selected epoxy compound has an epoxy equivalent weight up to about 500. Suitable such epoxy groups are described, for example, in U.S. Pat. Nos. 3,477,990 and 3,793,278; Canadian Pat. No. 893,191; German Patent Application No. 2,206,218 and the text *Handbook of Epoxy Resins*, by H. Lee and K. Neville, McGraw Hill, New York (1967). The preferred classes of epoxy compounds for use herein correspond to Formulas I, II and III below.

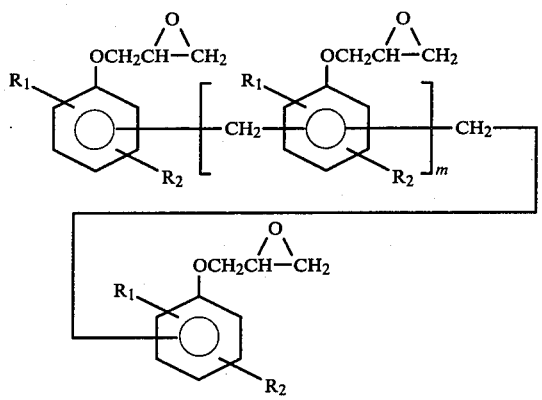

wherein $R_1$ and $R_2$ are hydrogen, lower alkyl of 1 to 6 carbon atoms, chlorine or bromine, and m has an average numerical value of up to about 3.

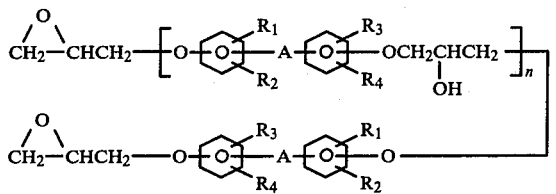

wherein $R_1$, $R_2$, $R_3$ and $R_4$ are each independently hydrogen, lower alkyl of 1 to 6 carbon atoms, chlorine or bromine and —A— is —S—, —O—, —S—S,

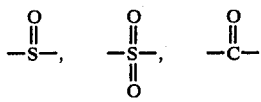

or a divalent saturated hydrocarbon of from 1 to 6 carbon atoms (e.g., methylene, ethylene, isopropylidene, cyclohexylidene, etc.) and n has an average numerical value of up to about 3. Also useful are the hydrogenated equivalents, such as those from hydrogenated bisphenol A.

In Formulas I and II, $R_1$–$R_4$ are each preferably hydrogen and A is preferably isopropylidene.

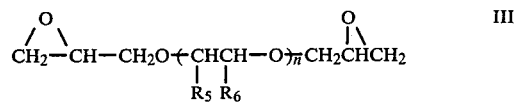

wherein $R_5$ and $R_6$ are each independently hydrogen or lower alkyl. Preferably, $R_5$ is hydrogen and $R_6$ is hydrogen or methyl and n has an average numerical value of up to about 30. The identity of $R_5$ and $R_6$ and the value of n are related. When $R_5$ and $R_6$ are larger substituents, n will be a lower value and vice versa.

Other aliphatic and aromatic epoxy compounds, such as the diglycidyl ether of cyclohexanedimethanol, will be apparent to the skilled worker.

The monoepoxide reactants correspond to Formula IV

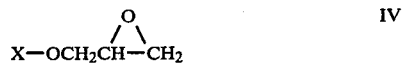

in which X is hydrocarbyl or inertly substituted hydrocarbyl of at least about 6 carbon atoms. X is preferably aryl or alkaryl and is more preferably phenyl or ($C_1$–$C_4$) alkylphenyl. Formula IV includes, for example, butyl glycidyl ether, phenyl glycidyl ether, t-butylphenyl glycidyl ether, tolyl glycidyl ether, chlorophenyl glycidyl ether, cyclohexyl glycidyl ether, benzyl glycidyl ether, n-octyl glycidyl ether, decyl glycidyl ether, dodecyl glycidyl ether, tetradecyl glycidyl ether and the like.

The Sulfide Reactants

The sulfide reactants here used are organic sulfides which are sometimes referred to as thioethers. The organic sulfides are likewise a well-known class of compounds having many members. Any member of this group can be used which reacts with epoxy groups. Preferred sulfides are those corresponding to the formula $R_5$-S-$R_6$ wherein $R_5$ and $R_6$ are each independently hydrocarbyl or inertly substituted hydrocarbyl groups of from 1 to about 24 carbon atoms or they are joined to form a 5- or 6-membered saturated heterocycle with the sulfur atom being one member of the heterocyclic ring and the remaining members of the ring are carbon or the heterocyclic ring may optionally contain one nonadjacent atom of oxygen, relative to the sulfur atom in the ring. More preferably, $R_5$ and $R_6$ are alkyl or hydroxyalkyl of from 1 to about 20 (most preferably 1 to 4) carbon atoms. Examples of suitable such sulfides include dimethyl sulfide, diethyl sulfide, dibutyl sulfide, dioctyl sulfide, methyl dodecyl sulfide, methyl octadecyl sulfide, ethyl phenyl sulfide, butyl tolyl sulfide, diallyl sulfide, cyclohexyl methyl sulfide, methyl hydroxyethyl sulfide, ethyl hydroxyethyl sulfide, butyl hydroxyethyl sulfide, bis(hydroxyethyl)sulfide, bis(2-hydroxypropyl)sulfide, bis(2-hydroxybutyl)sulfide, tetrahydrothiophene, p-thioxane and the like.

The Acid Reactants

The acids used herein are protic acids having a dissociation constant of at least about $1 \times 10^{-7}$, preferably $1 \times 10^{-5}$. Such acids are normally organic carboxylic acids and are more preferably monocarboxylic acids. Suitable acids include, for example, acrylic acid, methacrylic acid, maleic acid, itaconic acid, the half-ester formed by reacting 2-hydroxyethyl acrylate with phthalic anhydride, maleic anhydride, succinic anhydride and the like. Acrylic acid and methacrylic acid are the most preferred monocarboxylic acids. Mixtures of such acids can be used.

Mixtures of saturated acids and the acids bearing polymerizable vinyl groups can also be used. Mixtures of this type represent a means of limiting the vinyl functionality of the product, etc.

When the ester of the glycidyl ether and unsaturated acid is a monoester of a monoglycidyl ether, the carboxylic anion of the sulfonium molecule must be unsaturated and preferably is the same anion as that used in making the ester. When the ester is a polyester of a polyglycidyl ether, the carboxylic anion of the sulfonium molecule may be unsaturated, saturated or a mixture of saturated and unsaturated carboxylic acids.

Ratio of Reactants

The process outlined above produces sulfonium groups by the reaction of the sulfide and acid with the epoxy groups on the epoxy reactant and also produces ester groups by the reaction of the acid with the epoxy groups on the epoxy reactant. Sulfides are known to catalyze the esterification reaction between epoxy groups and carboxylic acids (or more properly perhaps the sulfonium groups generated in situ in such an instance are known to catalyze the esterification reaction). In the process, therefore, one utilizes sufficient amounts of sulfide to catalyze the esterification reaction and to present enough sulfonium groups in the final product to render the reaction product water-compatible. Normally, satisfactory results are achieved using from about 0.1 to about 0.8 equivalent of sulfide per epoxy equivalent weight of the epoxy compound. The acid reactant is normally used in essentially stoichiometric amounts (i.e., one equivalent per epoxy equivalent weight of the epoxy resin) or slight deficiency. The final products contain very few, if any, residual epoxy groups.

Order of Additional and Other Process Conditions

The compositions may be prepared by a one-step or a multistep process. In the one step process, the reactants are blended and the reaction mixture warmed until the reaction is complete. Alternatively, the epoxy group(s) or the epoxy reactant can be partially converted to ester groups in a conventional manner and the remaining epoxy groups subsequently converted to sulfonium groups as described in U.S. Pat. Nos. 3,793,278 or 4,020,030. The same result can be achieved by reversing these steps. If this technique is followed, the epoxy group(s) on the epoxy reactant is partially converted to sulfonium moieties (cf. U.S. Pat. No. 3,377,406) and the remaining epoxy groups later converted to ester groups by reaction with a carboxylic acid. Such a sequence requires no additional catalyst.

Generally, however, we find it convenient and prefer to prepare the instant compositions in a single step process. The reaction is conducted by contacting the epoxy resin, organic sulfide and acid at a temperature sufficient to cause the epoxy group(s) to be ring opened by the sulfide and acid at a temperature below the thermal decomposition of the reactants or products. Usually, a reaction temperature is chosen between about 25° and about 120° C. and preferably between about 60° and 90° C.

Water is preferably included in the process or the step of the process during which the sulfonium moiety is generated to increase the stability of the sulfonium moieties. However, suitable products can be prepared without adding water and can then be diluted with water to form the water-in-oil emulsion. The amount of water in the compositions can be any amount up to that where phase separation occurs. That amount will vary depending to a large extent on the amount of sulfonium salt present; the greater the concentration of salt, the more water can be included before phase separation.

Inhibitors, such as hydroquinone, p-methoxyphenol, phenothiazine and the like are normally added to the reaction mixture to prevent premature gelation of the product during processing by radical polymerization of vinyl double bonds. It is also useful in some instances to post-add such polymerization inhibitors to increase the shelf stability of the final product.

Optional cosolvents may be used to increase processability. Examples include lower alcohols (e.g., methanol, ethanol, etc.), ketones (e.g., acetone, methyl ethyl ketone, etc.) and reactive diluents (e.g., 2-hydroxyethyl acrylate, 2-hydroxypropyl acrylate, etc.). In general, however, their use is limited.

Utility

The compositions are useful coating materials which can be cured (i.e., cross-linked) by actinic light or ionizing radiation. The compositions are water-in-oil emulsions and are applied to substrates (such as wood, glass, metal, plastics, etc.) by conventional techniques. The coating is subsequently cured by passing the coated article under a source of actinic or ionizing radiation. Normally, this involves passing the coated article under a bank of ultraviolet lights or an electron beam. However, other methods may be used which generate a source of free radicals (e.g., heat, conventional free-radical initiators (peroxides, azobisisobutyronitrile, etc.) and the like).

The novel compositions can also be blended with conventional additives for use in coatings. Typical of such additives would include leveling agents, pigments, fillers, initiators, stabilizers, other vinyl materials, etc.

The following experimental data will further illustrate the invention.

Experiment 1

DER 331/Acrylic Acid/Thiodiethanol (1:1:0.3)

A diglycidyl ether of bisphenol-A (a liquid epoxy resin marketed by The Dow Chemical Company under the name DER 331 having an epoxy equivalent weight of about 190) (190 g; 1.0 equivalent), hydroquinone (0.07 g) and p-methoxyphenol (0.07 g) were combined in a 1-liter, 3-necked flask equipped with a mechanical stirrer, thermometer, dropping funnel and condenser. The contents of the flask were heated to 80° C. and a solution of thiodiethanol (36.6 g; 0.3 mole), acrylic acid (72 g; 1.0 mole) and water (27.0 g; 1.5 mole) was added dropwise to the stirred epoxy resin over a 15-minute period. The reaction temperature was maintained at 80° C. and conversion of the reactants was followed by acid consumption. The conversion was 81 percent complete after 100 minutes and 91 percent complete after 130 minutes when the reaction was quenched by cooling the reaction mixture to room temperature. Additional water (48 g) was added to adjust the solids level to 80 percent. The reaction product, both prior to and after dilution with water, was a clear transparent liquid.

In the same manner, similar products were obtained by using 0.1, 0.2, 0.4, 0.6 or 0.8 mole of thiodiethanol in place of the 0.3 mole used in Experiment 1.

Experiment 2
Diglycidyl Ether of Bisphenol-A/Acrylic Acid/Thiodiethanol (1:1:0.4)

A diglycidyl ether of bisphenol-A having an epoxy equivalent weight of about 176 (352 g; 2.0 equivalents), thiodiethanol (97.6 g; 0.8 mole) and phenothiazine (0.15 g) were combined in a 1-liter, 3-necked flask equipped with a mechanical stirrer, thermocouple, dropping funnel and condenser. The contents of the flask were heated to 70° C. and a solution of acrylic acid (144 g; 2.0 mole) and water (72 g) was added dropwise to the stirred epoxy resin mixture over a 65-minute period. The reaction temperature was maintained and conversion of the reactants followed by acid consumption. The conversion was 93 percent complete after 200 minutes. The temperature was then raised to 80° C. and held there for an additional 120 minutes, after which the reaction was quenched by cooling to room temperature.

A 50/50 (weight percent) mixture of this reaction product and the diglycidyl ether of bisphenol-A was prepared with efficient blending. This mixture quickly separated into two layers when allowed to stand. Conversely, the reaction product was very compatible with the diacrylate of DER 331; a 50/50 (weight percent) mixture formed one homogeneous liquid layer.

Experiment 3
DER 736/Acrylic Acid/Thiodiethanol (1:1:0.3)

A diglycidyl ether of a polypropylene glycol (a liquid epoxy resin marketed by The Dow Chemical Company under the name DER 736) having an epoxy equivalent weight of about 190 (190 g; 1.0 equivalent), hydroquinone (0.07 g) and p-methoxyphenol (0.07 g) were combined in a reaction vessel equipped as set forth in Experiment 1. This epoxy resin was similarly reacted with thiodiethanol, acrylic acid and water in amounts and under conditions set forth in Experiment 1. The conversion was 95 percent complete at 70 minutes and 100 percent complete at 80 minutes of reaction time. The final reaction product was 92 percent solids and water and had a Gardner viscosity of U. This reaction product was easily diluted with water in amounts up to about 35 weight percent water before phase separation occurs.

A 50/50 (weight percent) mixture of this reaction product and the diglycidyl ether of polypropylene glycol quickly formed two layers. A 50/50 (weight percent) mixture of the reaction product and the diacrylate ester of the diglycidyl ether of polypropylene glycol formed but one liquid layer.

Experiment 4
DEN 438/Acrylic Acid/Thiodiethanol (1:1:0.3)

A polyglycidyl ether of a phenol formaldehyde condensate (a liquid epoxy novolac resin marketed by The Dow Chemical Company under the name DEN 438 (178 g; 1.0 equivalent), hydroquinone (0.07 g) and p-methoxyphenol (0.07 g) were combined in a 500 ml, 3-necked flask equipped with a mechanical stirrer, thermometer, dropping funnel and condenser. This epoxy resin was similarly reacted with thiodiethanol, acrylic acid and water in amounts and under conditions set forth in Experiment 1. Conversion was 72 percent complete after 80 minutes and 91 percent complete after 255 minutes at 80° C. The reaction was quenched after 255 minutes by cooling and additional water (45 g) added to adjust the solids level to 80 percent by weight.

Experiment 5
1,2-Epoxy-3-phenoxy Propane/Acrylic Acid/-Thiodiethanol (1:1:0.2)

1,2-Epoxy-3-phenoxy propane (150 g; 1.0 equivalent), hydroquinone (0.06 g) and p-methoxyphenol (0.06 g) were combined in a reaction vessel detailed in Experiment 4. The flask and contents were heated to 80° C. and a solution of thiodiethanol (24.4 g; 0.2 equivalent), acrylic acid (72 g; 1.0 equivalent), and water (18 g) was added dropwise over a 25-minute period with stirring. A reaction temperature was similarly maintained at 80° C. and conversion followed by acid consumption. The conversion was 66 percent complete at 45 minutes, 86 percent complete at 170 minutes and 88 percent complete at 390 minutes at which time the reaction was quenched. Additional water (9.0 g) was added to adjust the solids level to 90 weight percent.

A 50/50 (weight percent) mixture of the reaction product and the diacrylate of DER 331 formed one liquid layer having a Gardner viscosity of 2,100 centistokes (cs) at 25° C.

Experiment 6
Glycidyl Ether of a Mixture of $C_8$–$C_{10}$ Alkanols/-Acrylic Acid/Thiodiethanol (1:1:0.6)

A mixture of glycidyl ethers of $C_8$ and $C_{10}$ alkanols (marketed by Proctor and Gamble under the name Epoxide 7) (230 g; 1.0 equivalent), hydroquinone (0.09 g) and p-methoxyphenol (0.09 g) were combined in a reaction vessel detailed in Experiment 4. The flask and contents were heated to 70° C. and a solution of thiodiethanol (73.2 g; 0.6 equivalent), acrylic acid (72 g; 1.0 equivalent) and water (54 g) was added dropwise over a 25-minute period with stirring. The reaction temperature was maintained at 70° C. and conversion followed by acid consumption. The conversion was 75 percent complete at 235 minutes and 85 percent complete at 370 minutes at which time the reaction was quenched. Additional hydroquinone (0.09 g) and p-methoxyphenol (0.09 g) were added. The reaction product was a clear transparent liquid.

A 50/50 (weight percent) mixture of the reaction product and the diacrylate of DER 331 formed one homogeneous liquid layer having a Gardner viscosity of 850 cs at 25° C. Additional water was added to increase the total water to approximately 22 weight percent. This reduced the Gardner viscosity to 450 cs without phase separation occurring.

Utility as Coating Compositions

Formulations of reaction products from the above experiments were applied to cold rolled steel Bonderite 37 panels using a wire wound coating rod. The coated panels were passed under a bank of three 100-watt per linear inch medium pressure mercury arc lamps (Union Carbide PSC) at a rate of from 100 to 500 feet per minute, as indicated below.

The product of Experiment 1 (2.07 g) was blended with N,N-dimethylaminoethanol (0.42 g) and benzophenone (0.40 g). The viscosity of this mixture was reduced by adding 1.0 g of water to give a clear formulation containing 77 weight percent solids. This formulation was coated onto the panel as per above and cured to a tack-free surface by one pass under the arc lamps at 200 feet per minute. Similar results were achieved by replacing the N,N-dimethylaminoethanol with N,N-dimethylaniline in the formulation.

The product of Experiment 2 (30.26 g) was formulated with Vicure 10 (0.54 g) and additional water (5.91 g) to give a clear formulation containing 75 weight percent solids. This formulation cured to a tack-free surface with one pass at 100 feet per minute.

The product of Experiment 3 (20.3 g) was formulated with N,N-dimethylaminoethanol (0.46 g) and benzophenone (0.46 g) to give a clear formulation containing 92 weight percent solids. This formulation cured to a tack-free surface with one pass at 200 feet per minute.

The products of Experiment 2 (20.1 g) and Experiment 3 (4.2 g) were combined and formulated with methyldiethanolamine (0.54 g), benzophenone (0.54 g) and water (4.76 g) to give a clear formulation of approximately 76 weight percent solids. This formulation cured to a tack-free surface with one pass at 100 feet per minute.

The product of Experiment 4 (13.97 g) was formulated with N,N-dimethylaminoethanol (0.28 g) and benzophenone (0.28 g) and water (3.03 g) to give a clear formulation having 67 weight percent solids. This formulation cured to a tack-free surface with one pass at 100 feet per minute.

The product of Experiment 5 (15.2 g) was formulated with N,N-dimethylaminoethanol (0.33 g) and benzophenone (0.33 g) to give a clear formulation of approximately 90 weight percent solids. This material cured to a tack-free surface after six passes at a rate of 100 feet per minute.

The product of Experiment 5 (25.0 g) was blended with the diacrylate of DER 331 (24.3 g) and formulated with dimethylaminoethanol (1.23 g) and benzophenone (1.23 g) to give a clear formulation of approximately 95 weight percent solids. This material cured to a tack-free surface after one pass at a rate of 100 feet per minute.

The product of Experiment 6 (27.1 g) was blended with the diacrylate of DER 331 (26.8 g) and formulated with dimethylaminoethanol (1.35 g) and benzophenone (1.35 g) to give a clear formulation of approximately 93 weight percent solids. This material cured to a tack-free surface after one pass at a rate of 100 feet per minute.

Similar compositions to these were also cured with electron beam radiation with similarly beneficial results.

It is observed that the cross-linked coatings obtained on formulations from Experiments 1–6 as indicated above had high gloss when the amount of water in the formulation was not more than about 35 percent. At higher amounts of water, the gloss tended to be somewhat lower. This was true whether the formulation was cross-linked by ultraviolet radiation or by electron beam.

The reaction product from Experiments 1–6 were found to be generally compatible with acrylates of epoxy resins (i.e., the reaction product of acrylic acid with DER 331, DER 736 or DEN 438). The blends were water-compatible and could be thinned (i.e., their viscosities reduced) by the addition of water. No macrophase separation of the blends was observed.

In contrast, attempts to blend the products of Experiments 1–4 with the corresponding epoxy resin resulted in macrophase separation.

The diacrylate of DER 331 blended easily with DER 331 under substantially anhydrous conditions without macrophase separation. Likewise, the diacrylate of DER 736 blended readily with DER 736 without macrophase separation; and without water, the reaction product of DER 736/acrylic acid/thiodiethanol (1:1:0.3) blended easily with DER 736 without macrophase separation.

The above information shows that the instant class of compounds are water-compatible and easily blended with acrylate systems and useful in forming coating formulations to be cured by actinic light or ionizing radiation. The above data also show that the instant class of products have properties substantially different than compounds described by the references enumerated under the Background of the Invention. With the exception of Harris et al., the other references prepared sulfonium-modified epoxy resins or other onium-modified epoxy resins having residual epoxy groups. Such compositions were, therefore, aqueous dispersions (i.e., oil-in-water dispersions) of epoxy resins. Harris et al. prepared products in which some or all of the epoxy groups were converted but their main thrust was to convert most of the epoxy groups to the corresponding sulfonium moieties and their products were oil-in-water dispersions.

In the instant invention, the thrust is to convert sufficient numbers of the epoxy groups to sulfonium groups to render the product capable of dispersing water in the resin as continuous oil phase and convert the remainder of the epoxy groups to an ester grouping which can be cured by actinic light or ionizing radiation.

The above experiments are meant to be illustrative and other embodiments of the invention will be readily apparent to those skilled in the art.

What is claimed is:

1. A sulfonium-stabilized, water-compatible, radiation curable, water-in-oil emulsion of a resinous composition comprising (1) molecules containing ester groups resulting from the esterification of an epoxy compound having an epoxy equivalent weight of up to 500 and an unsaturated monocarboxylic acid having a dissociation constant of at least $1 \times 10^{-7}$ and (2) molecules containing sufficient sulfonium groups to make said resinous composition water compatible, said molecules being the reaction product of essentially equivalent amounts of a glycidyl ether and an unsaturated acid reacted in the presence of an organic sulfide, said sulfonium groups having the structure:

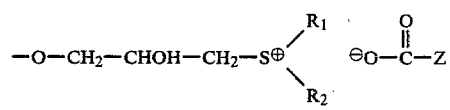

wherein $R_1$ and $R_2$ are hydrocarbyl or inertly substituted hydrocarbyl groups of from 1 to 24 carbon atoms or $R_1$ and $R_2$ together with the sulfur form a 5- or 6-membered heterocyclic ring and Z is the noncarboxylic portion of the same unsaturated monocarboxylic acid as in the ester (1) when said ester is the mono-ester of a mono-glycidyl ether and Z is the noncarboxylic portion of a saturated or unsaturated monocarboxylic acid when (1) is a polyester of a polyglycidyl glycidyl ether.

2. The composition defined by claim 1 wherein said unsaturated monocarboxylic acid of ester (1) is acrylic or methacrylic acid.

3. The composition defined by claim 2 wherein the sulfonium moiety of molecule (2) is a sulfonium acrylate or methacrylate.

4. The composition defined by claim 1 wherein said molecule containing ester groups is derived from an epoxy compound bearing, on the average, at least one vicinal epoxy group per molecule.

5. The composition defined by claim 4 wherein said epoxy compound bears, on the average, at least one glycidyl group per molecule.

6. The composition defined by claim 5 wherein said epoxy compound corresponds to the formula:

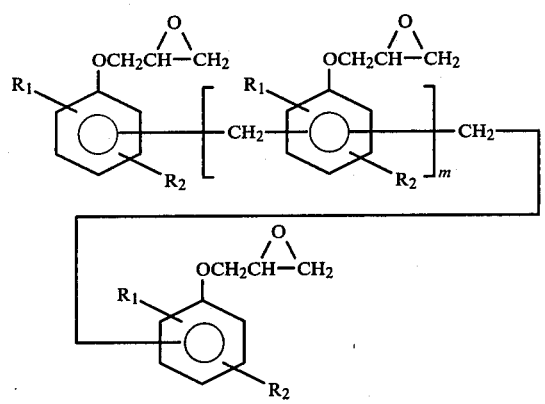

wherein $R_1$ and $R_2$ are hydrogen, lower alkyl of 1 to 6 carbon atoms, chlorine or bromine and m has an average numerical value of up to about 3; or

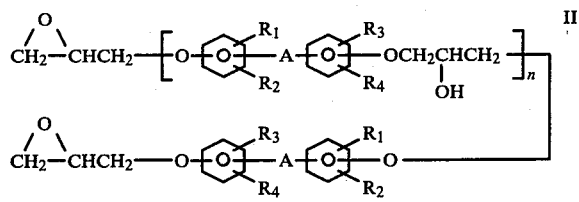

wherein $R_1$, $R_2$, $R_3$ and $R_4$ are each independently hydrogen, lower alkyl of 1 to 6 carbon atoms, chlorine or bromine and —A— is —S—, —O—, —S—S—,

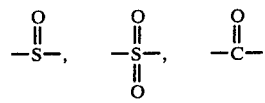

or a divalent saturated hydrocarbon of from 1 to 6 carbon atoms and n has an average numerical value of up to about 3; or

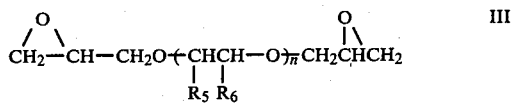

wherein $R_5$ and $R_6$ are each independently hydrogen or lower alkyl and n has a numerical value of up to 30.

7. The composition defined by claim 6 wherein said molecule (1) bears acrylate or methacrylate moieties and wherein the sulfonium moiety of molecule (2) is a sulfonium acrylate or methacrylate.

8. The composition defined by claim 5 wherein said composition is the reaction product of (1) said glycidyl ether with (2) about one equivalent of acrylic or methacrylic acid and (3) from about 0.1 to about 0.8 equivalent of an aliphatic sulfide having a total carbon content of from 2 to about 12 carbon atoms or a 5- or 6-membered heterocyclic sulfide in which the sulfur atom is a hetero atom in the ring.

9. The composition defined by claim 8 wherein said glycidyl ether is (a) the diglycidyl ether of a polypropylene glycol having an epoxy equivalent weight of from about 94 to about 500 or (b) is the reaction product of epichlorohydrin with bisphenol A having an epoxy equivalent weight of from about 170 to about 500 and wherein said sulfide is dimethyl sulfide, diethyl sulfide, ethyl hydroxyethyl sulfide, bis(2-hydroxyethyl)sulfide or bis(2-hydroxypropyl)sulfide.

10. The composition defined by claim 8 comprising said reaction product plus a diester of a diglycidyl ether and an unsaturated monocarboxylic acid.

11. The composition defined by claim 3 wherein said sulfonium acrylate or methacrylate is $C_6H_5$-O-$CH_2CH(OH)CH_2S^{\oplus}(CH_2CH_2OH)_2$acrylate$^{\ominus}$ or $(C_8-C_{10})$alkyl-O-$CH_2CH(OH)CH_2S^{\oplus}(CH_2CH_2OH)_2$acrylate$^{\ominus}$ and said molecule (1) is the diacrylate formed by reacting acrylic acid with the diglycidyl ether of bisphenol A.

* * * * *